United States Patent
Hsu et al.

(10) Patent No.: US 9,686,770 B2
(45) Date of Patent: *Jun. 20, 2017

(54) METHODS TO SUPPORT MBMS SERVICE CONTINUITY AND COUNTING AND LOCALIZED MBMS SERVICE

(75) Inventors: Chia-Chun Hsu, Taipei (TW); Yih-Shen Chen, Hsinchu (TW)

(73) Assignee: MEDIATEK Inc., Hsinchu (TW)

(*) Notice: Subject to any disclaimer, the term of this patent is extended or adjusted under 35 U.S.C. 154(b) by 403 days.

This patent is subject to a terminal disclaimer.

(21) Appl. No.: 13/134,708

(22) Filed: Jun. 14, 2011

(65) Prior Publication Data
US 2011/0305183 A1 Dec. 15, 2011

Related U.S. Application Data (60) Provisional application No. 61/354,791, filed on Jun. 15, 2010, provisional application No. 61/357,706, filed on Jun. 23, 2010.

(51) Int. Cl.
*H04L 12/00* (2006.01)
*H04W 72/00* (2009.01)
(Continued)

(52) U.S. Cl.
CPC ...... *H04W 72/005* (2013.01); *H04W 36/0055* (2013.01); *H04W 36/08* (2013.01); *H04W 92/04* (2013.01)

(58) Field of Classification Search
USPC ....... 370/252, 254, 255, 312, 328, 329, 400, 370/401, 465
See application file for complete search history.

(56) References Cited

U.S. PATENT DOCUMENTS

| 2005/0041608 A1 | 2/2005 | Jeong et al. ............... 370/310 |
| 2005/0063339 A1 | 3/2005 | Jeong et al. ............... 370/331 |

(Continued)

FOREIGN PATENT DOCUMENTS

| AU | 2008336973 B2 | 12/2007 |
| CN | 1630412 A | 10/2003 |

(Continued)

OTHER PUBLICATIONS

International Search Report and Written Opinion of International Search Authority for PCT/CN2011/075777 dated Sep. 29, 2011 (12 pages).

(Continued)

*Primary Examiner* — Yemane Mesfin
*Assistant Examiner* — Mon Cheri Davenport
(74) *Attorney, Agent, or Firm* — Imperium Patent Works; Zheng Jin; Helen Mao (57) ABSTRACT

Network-assisted solutions are provided to maintain MBMS service continuity, to provide efficient localized MBMS service, and to achieve intelligent MBMS service management. In a first embodiment, a source eNB acquires MBMS information of neighbor cells and acquires MBMS reception/interest status information of a UE. Based on the acquired information, the source eNB makes handover decision for the UE to handover to a selected target cell and maintain MBMS service continuity. In a second embodiment, location information of a localized MBMS service is provided to a UE. Based on the location information, the UE is able to receive the localized MBMS service with minimum power consumption. In a third embodiment, an MBMS counting procedure is provided for an eNB to count the number of UEs that are receiving or are interested in MBMS service(s). Based on the counting result, the MBMS service (s) can be enabled or disabled accordingly.

12 Claims, 5 Drawing Sheets (51) Int. Cl.
  *H04W 36/00* (2009.01)
  *H04W 36/08* (2009.01)
  *H04W 92/04* (2009.01)

(56) References Cited

U.S. PATENT DOCUMENTS

| | | | |
|---|---|---|---|
| 2005/0090278 A1* | 4/2005 | Jeong et al. | 455/525 |
| 2005/0111393 A1* | 5/2005 | Jeong et al. | 370/312 |
| 2005/0213583 A1 | 9/2005 | Lee et al. | 370/395.5 |
| 2006/0034205 A1* | 2/2006 | Kim | 370/312 |
| 2006/0050672 A1 | 3/2006 | Shim et al. | 370/338 |
| 2006/0058034 A1 | 3/2006 | Vaittinen et al. | 455/450 |
| 2007/0050833 A1 | 3/2007 | Park | 725/117 |
| 2008/0084871 A1 | 4/2008 | Wang et al. | 370/352 |
| 2008/0212546 A1 | 9/2008 | Fischer | 370/338 |
| 2008/0267109 A1* | 10/2008 | Wang | H04W 72/005 370/312 |
| 2008/0268878 A1 | 10/2008 | Wang et al. | 455/458 |
| 2008/0287129 A1 | 11/2008 | Somasundaram et al. | 455/436 |
| 2009/0122740 A1 | 5/2009 | Bouazizi | 370/312 |
| 2009/0180417 A1 | 7/2009 | Frost et al. | 370/312 |
| 2010/0056137 A1 | 3/2010 | Kamei | 455/426.1 |
| 2010/0093352 A1 | 4/2010 | Kubota | 455/436 |
| 2010/0110945 A1 | 5/2010 | Koskela et al. | 370/310 |
| 2010/0113030 A1* | 5/2010 | Kanazawa et al. | 455/437 |
| 2010/0159933 A1* | 6/2010 | Kim et al. | 455/436 |
| 2010/0189027 A1 | 7/2010 | Ishida et al. | 370/312 |
| 2010/0272004 A1 | 10/2010 | Maeda et al. | 370/312 |
| 2011/0019605 A1 | 1/2011 | Ma et al. | 370/312 |
| 2011/0039551 A1 | 2/2011 | Tsuboi et al. | 455/424 |
| 2011/0077006 A1 | 3/2011 | Hsu | 455/436 |
| 2011/0085488 A1* | 4/2011 | Widegren | H04W 72/005 370/312 |
| 2011/0141908 A1 | 6/2011 | Ishida et al. | 370/241 |
| 2011/0222457 A1* | 9/2011 | Lee et al. | 370/312 |
| 2011/0305183 A1 | 12/2011 | Hsu et al. | 370/312 |
| 2011/0305184 A1* | 12/2011 | Hsu | 370/312 |

FOREIGN PATENT DOCUMENTS

| | | |
|---|---|---|
| CN | 101595742 A | 1/2007 |
| CN | 101242573 A | 2/2007 |
| CN | 101675671 A | 4/2007 |
| EP | 2302969 A1 | 9/2009 |
| JP | 2005223718 | 2/2004 |
| JP | 2007522758 | 2/2004 |
| JP | 2008503148 | 6/2004 |
| JP | 2008511218 | 9/2004 |
| JP | 2008514047 | 9/2004 |
| JP | 2007068172 | 8/2005 |
| JP | 2007201941 | 1/2006 |
| JP | 2009188612 | 2/2008 |
| JP | 2009206858 | 2/2008 |
| JP | 2010028726 | 7/2008 |
| WO | WO2008155915 | 6/2007 |
| WO | WO2009053879 A1 | 10/2007 |
| WO | WO2009078152 A1 | 12/2007 |
| WO | WO2009133764 | 4/2008 |
| WO | WO2009133767 | 4/2008 |
| WO | WO2009133767 A1 | 4/2008 |
| WO | WO2010018658 | 8/2008 |

OTHER PUBLICATIONS

SIPO, Examination Report of Chinese patent application 201180001837.2 dated Apr. 27, 2013 (10 pages).
JPO, Office Action for JP patent application 2013-513545 dated Jan. 21, 2014 (4 pages).
Taiwan IPO, Office Action for TW patent application 100120834 dated Jan. 14, 2014 (7 pages).
JPO, Office Action for JP patent application 2013-513544 dated Jan. 14, 2014 (4 pages).
International Search Report and Written Opinion of International Search Authority for PCT/CN2011/075762 dated Sep. 29, 2011 (9 pages).
SIPO, The First Examination Report of CN patent application 201180001834.9 dated Jul. 2, 2013 (8 pages).
3GPP TSG-RAN WG2 #67bis R2-095689, LG Electronics Inc.; "Discussion on Service Continuity"; Miyazaki, Japan, Oct. 12-16, 2009 (4 pages).
USPTO, Office Action for related U.S. Appl. No. 13/134,735 dated Jul. 3, 2013 (13 pages).
USPTO, Office Action for related U.S. Appl. No. 13/134,735 dated Mar. 26, 2014 (17 pages).
USPTO, Office Action for related U.S. Appl. No. 13/134,735 dated Dec. 17, 2014 (21 pages).
JPO, Office Action for the JP patent application 2014-087611 dated Nov. 25, 2014 (5 pages).
USPTO, Notice of Allowance for related U.S. Appl. No. 13/134,735 dated Jul. 2, 2015 (9 pages).
Taiwan IPO, Office Action for the TW patent application 100120835 dated Feb. 12, 2015 (6 pages).
JPO, Office Action for the JP patent application 2014-087610 dated Mar. 17, 2015 (5 pages).
JPO, Office Action for the JP patent application 2014-087610 dated Dec. 15, 2015 (8 pages).
EPO, Search Report for the EP patent application 11795180.6 dated Sep. 8, 2015 (13 pages).
3GPP TSG-RAN WG2 #67bis R2-095689, LG Electronics, Discussion on Service Continuity, Miyazaki, Japan dated Oct. 12-16, 2009 (4 pages).
"3rd Generation Partnership Project; Technical Specification Group Services and System Aspects; Multimedia Broadcast/Multicast Service (MBMS); architecture and Functional Description (Release 9)", pp. 1-65, Section 8.7 p. 47-49 (TS 23.246 V9.5.0).
3rd Generation Partnership Project; Technical Specification group Radio access Network; Evolved Universal terrestrial Radio access (E-UTRA) and Evolved Universal Terrestrial Radio access Network (E-UTRAN); Overall Description; Stage 2 (Release 9), Section 15.3.3; Section 15.4. (TS 36.300 V9.3.0).
EPO, Search Report for the EP patent application 11795182.2 dated Oct. 5, 2015 (7 pages).

* cited by examiner

METHODS TO SUPPORT MBMS SERVICE CONTINUITY AND COUNTING AND LOCALIZED MBMS SERVICE

CROSS REFERENCE TO RELATED APPLICATIONS

This application claims priority under 35 U.S.C. §119 from U.S. Provisional Application No. 61/354,791, entitled "Methods to Support MBMS Mobility and Dedicated MCCH LCID Enhancement", filed on Jun. 15, 2010; U.S. Provisional Application No. 61/357,706, entitled "Methods to Support MBMS Mobility and Status Report", filed on Jun. 23, 2010; the subject matter of which is incorporated herein by reference.

TECHNICAL FIELD

The disclosed embodiments relate generally to Multimedia Broadcast and Multicast Service (MBMS), and, more particularly, to support MBMS service continuity and counting and localized MBMS service for user equipments (UE) in wireless communication networks.

BACKGROUND

A Long-Term Evolution (LTE) system offers high peak data rates, low latency, improved system capacity, and low operating cost resulting from simple network architecture. An LTE system also provides seamless integration to older wireless networks, such as Global System for Mobile Communications (GSM), Code Division Multiple Access (CDMA), and Universal Mobile Telecommunication System (UMTS). In LTE systems, an evolved universal terrestrial radio access network (E-UTRAN) includes a plurality of evolved Node-Bs (eNBs) communicating with a plurality of mobile stations, referred as user equipments (UEs).

Enhancements to LTE systems are considered by the third Generation Partnership Project (3GPP) so that they can meet or exceed International Mobile Telecommunications Advanced (IMT-Advanced) fourth generation (4G) standard. One of the key enhancements is to support bandwidth up to 100 MHz and be backwards compatible with the existing wireless network system. Carrier aggregation (CA), where two or more component carriers (CCs) are aggregated, is introduced into LTE-Advanced systems to improve overall system throughput.

Multimedia Broadcast and Multicast Service (MBMS) is a broadcasting service offered via existing GSM and UMTS cellular networks. Recently, evolved MBMS (E-MBMS) has been introduced in the LTE specification for broadcasting or multicasting TV, films, and other information such as overnight transmission of newspapers in a digital form. To facilitate MBMS in LTE systems, a multicast control channel (MCCH) is used for the transmission of MEMS control information in each MBMS Single Frequency Network (MBSFN) area, and a multicast traffic channel (MTCH) is used for the transmission of user traffic to UEs receiving MBMS data packets. MBMS has the major benefit that the network infrastructure already exists for mobile network operators and that deployment can be cost effective compared with building a new network for the service. The broadcast capability enables to reach unlimited number of users with constant network load. The broadcast capability also enables the possibility to broadcast information simultaneously to many cellular subscribers, such as emergency alerts.

MBMS service continuity is important for MBMS user experience. The mobility of a UE should affect MBMS service reception as less as possible. However, there is no network-assisted MBMS service continuity supported by the current LTE specification (e.g., in LTE Rel-9). Furthermore, with the addition of carrier aggregation (CA) in LTE-A systems, and with the possibility of network base stations (e.g., eNBs) covered by multiple MBSFN areas, it is foreseeable that an eNB can be associated with more than one MBSFN areas. Network-assisted solutions for MBMS service continuity under such scenario are also desirable. Localized MBMS service is another feature supported by MBMS. Localized MBMS service is relevant to a specific area much smaller than an MBSFN area. How to assist UE to efficiently receive localized MEMS service in the specific area is desirable. It is further desirable that the MBMS network can achieve certain level of intelligent control (e.g., MBSFN subframe allocation, service management, etc.) based on MBMS service reception status of UE.

SUMMARY

Network-assisted solutions are provided to maintain MBMS service continuity after handover or cell reselection, to provide efficient localized MBMS service, and to achieve intelligent MBMS service management.

In a first embodiment, a source eNB acquires MBMS information of neighbor cells and acquires MBMS reception/interest status information of a UE. MBMS information comprises an MBMS single frequency network (MBSFN) area ID and an MBMS service list of MBMS service IDs supported by each neighbor cell. MBMS reception or interest status information comprises the MBSFN area ID or the MBMS service IDs that the UE is currently receiving or is interested in reception. Based on the acquired information, the source eNB makes handover decision for the UE to handover to a selected target cell and maintain MBMS service continuity.

In a second embodiment, location information of a localized MBMS service is provided to a UE. Based on the location information, the UE is able to receive the localized MBMS service with minimum power consumption. The location information may be semi-static or dynamic. In one example, the location information contains non-geometric description such as a cell ID. In another example, the location information contains geometric description such as GNSS coordinates.

In a third embodiment, an MBMS counting request procedure is used to trigger an eNB to count the number of UEs that are receiving MBMS service(s) or are interested in the reception of MBMS service(s). An MBMS counting result report procedure is used to provide an MCE with the number of UEs that are receiving MBMS service(s) or are interested in the reception of MBMS service(s). Based on the counting result, the MBMS service(s) can be enabled or disabled accordingly.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
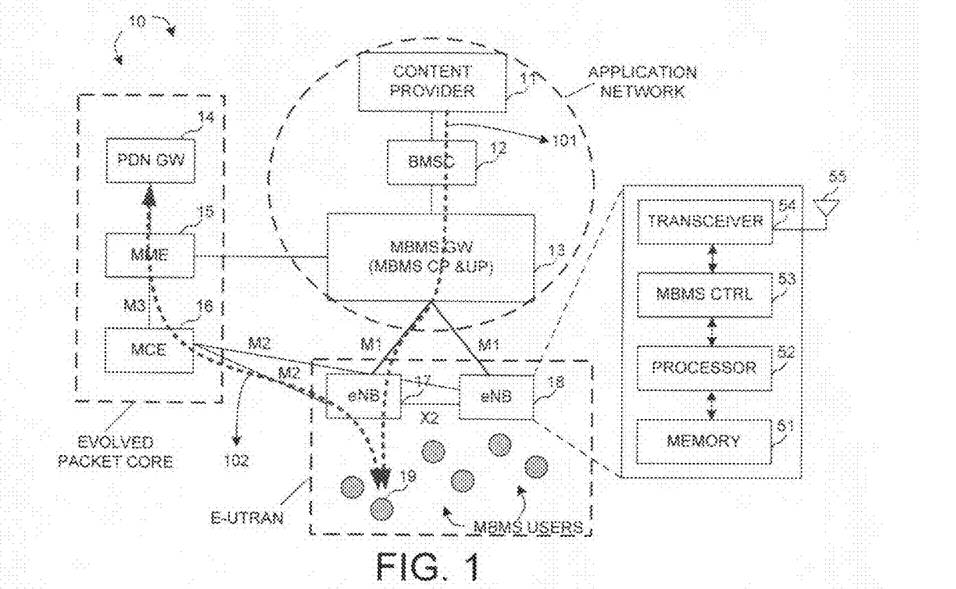
FIG. 1 illustrates a logical architecture of an LTE system supporting MBMS service in accordance with one novel aspect.

FIG. 1 illustrates a logical architecture of an Long-Term Evolution (LTE) system 10 supporting Evolved Multimedia Broadcast and Multicast Service (E-MBMS) service in accordance with one novel aspect. LTE system 10 comprises a content provider 11, a Broadcast Multicast Service Center (BMSC) 12, an MBMS gateway (MBMS-GW) 13 for MBMS CP&UP, a packet data network gateway (PDN-GW) 14, a mobility management entity (MME) 15, a multi-cell/multicast coordination entity (MCE) 16, two evolved Node-Bs eNB 17 and eNB 18, and a plurality of MBMS users (e.g., user equipments (UEs)). Each eNB comprises memory 51, a processor 52, an MBMS control module 53, and a transceiver 54 coupled to an antenna 55.

When a UE subscribes to a specific MBMS service, MBMS data packets are transmitted from content provider 11, through BMSC 12, through MBMS GW 13, through eNB 17, and then to UE 19 (e.g., depicted by a thick dotted line 101). On the other hand, MBMS control information is communicated between PDN-GW 14 and UE 19 via MME 15, MCE 16 and eNB 17 (e.g., depicted by a thick dotted line 102). As illustrated in FIG. 1, eNB 17 and eNB 18 are connected to MBMS GW 13 via a pure user plane interface M1. MBMS GW 13 is a logical entity whose main function is broadcasting MBMS packets with SYNC protocol to each eNB transmitting a corresponding MBMS service. A SYNC protocol layer is defined on the transport network layer (TNL) to support content synchronization mechanism. The SYNC protocol carries additional information that enables the eNBs to identify the timing for radio frame transmission as well as detect packet loss.

In addition to the M1 interface, two control plane interfaces M2 and M3 are defined in LTE system 10. The application part on the M2 interface conveys radio configuration information between the eNBs and MCE 16, and the application part on the M3 interface performs MBMS session control signaling on MBMS bearer level between MCE 16 and MME 15. MCE 16 is a logical entity, which can also be part of another network element such as inside an eNB. MCE 16 performs functions such as the allocation of the radio resources used by all the eNBs in an MBMS Single Frequency Network (MBSFN) area as well as determining the radio configuration including the modulation and coding scheme (MCS). One important application of the M3 interface is MBMS session control signaling. MBMS session control signaling on Evolved Packet System (EPS) bearer level is triggered by the Evolved Packet Core (EPC) to establish a virtual connection between the UEs and PDN-GW 14 (e.g., an "EPS bearer" that provides a "bearer service"—a transport service with specific QoS attributes). The MBMS session start procedure is to request the E-UREAN to notify the UE about an upcoming MBMS Session of a given MBMS Bearer Service and to establish an MBMS E-RAB for this MBMS Session. The MBMS session stop procedure is to request the E-UTRAN to notify the UE about the end of a given MBMS Session and to release the corresponding MBMS E-RAB for this MBMS Session.

In accordance with one novel aspect, network-assisted solutions are provided to maintain MBMS service continuity, to provide efficient localized MBMS service, and to achieve intelligent MBMS service management. The details of various network-assisted solutions are now described below with accompanying drawings.

MBMS Service Continuity

Figure 2:
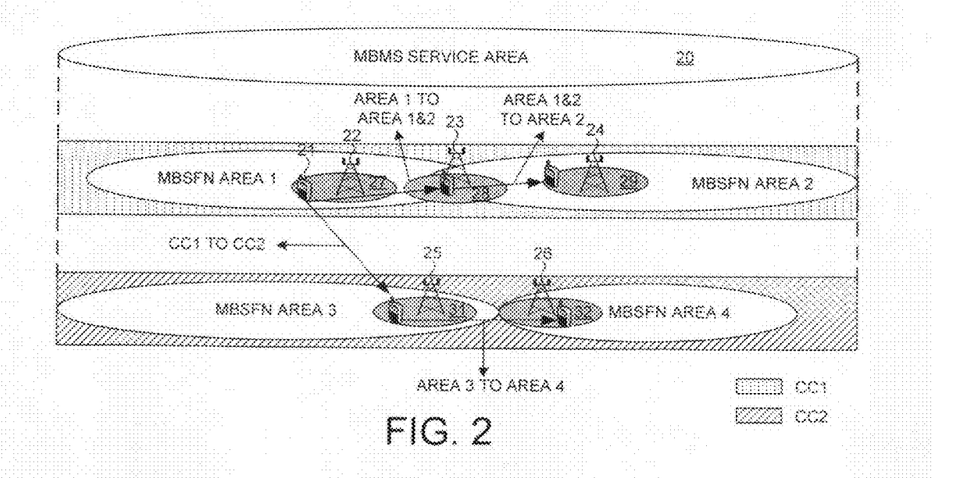
FIG. 2 illustrates network-assisted MBMS service continuity in an MBMS service (or synchronization) area in accordance with one novel aspect.

FIG. 2 illustrates network-assisted MEMS service continuity in MBMS service (or synchronization) area 20 in accordance with one novel aspect. MBMS service area 20 covers multiple MBSFN areas (e.g., MBSFN areas 1-4). An MBSFN area comprises a group of cells within an MBSFN service area of a network that are co-ordinate to achieve MBSFN transmission. An MBSFN service area is defined as an area of network in which all eNBs can be synchronized to perform MBSFN transmission. MBMS service areas are capable of supporting one or more MBSFN areas. On a given frequency layer, an eNB can only belong to one MBMS service area. Under the MBMS service area, a cell can belong to one or more MBSFN areas and support MBMS services for all the belonging MBSFN areas.

In the example of FIG. 2, eNB 22 belongs to MBSFN area 1 and serves cell 27 for MBMS service over component carrier 1 (CC1), eNB 23 belongs to both MBSFN area 1 and area 2 and serves cell 28 for MBMS service over CC1, eNB 24 belongs to MBSFN area 2 and serves cell 29 for MBMS service over CC1, eNB 25 belongs to MBSFN area 3 and serves cell 31 for MBMS service over CC2, and eNB 26 belongs to MBSFN area 4 and serves cell 32 for MBMS service over CC2. UE 21 initially subscribes to a specific MBMS service in cell 27 served by eNB 22, and later moves around to different cells served by different eNBs. In one example, UE 21 first receives subscribed MBMS service in MBSFN area 1 in cell 27, then moves to MBSFN area 1&2 in cell 28, and then moves to MBSFN area 2 in cell 29. In another example, UE 21 first receives MBMS service in MBSFN area 1 in cell 27, then moves to MBSFN area 3 in cell 31, and then moves to MBSFN area 4 in cell 32.

When UE 21 moves from cell to cell, UE 21 will either perform handover or cell reselection. In LTE systems, two radio resource control (RRC) states namely RRC_IDLE and RRC_CONNECTED are defined. A UE moves from RRC_IDLE state to RRC_CONNECTED state when an RRC connection is successfully established. A UE can move back from RRC_CONNECTED state to RRC_IDLE state by releasing the RRC connection. In the RRC_IDLE state, UE can receive broadcast/multicast data, monitors a paging channel to detect incoming calls, performs neighbor cell measurements and cell selection/reselection, and acquires system information. Mobility is controlled by the UE in the RRC_IDLE state. In the RRC_CONNECTED state, the transfer of unicast data to/from UE, and the transfer of broadcast/multicast data to UE can take place. The UE monitors control channels associated with the shared data channel to determine scheduled data, provides channel quality feedback information, performs neighbor cell measurements and measurement reporting, and acquires system information. Unlike the RRC_IDLE state, mobility and handovers in the RRC_CONNECTED state are network-controlled and assisted by the UE.

In one novel aspect, when UE21 is in RCC_CONNECTED state and when handover is considered necessary, its serving eNB will acquire MBMS service information and reception status to make handover decisions such that service continuity can be maintained. Similarly, when UE21 is in RCC_IDLE state, its serving eNB will assist UE21 to acquire MBMS information for making mobility and service continuity decisions during cell reselection.

Figure 3:
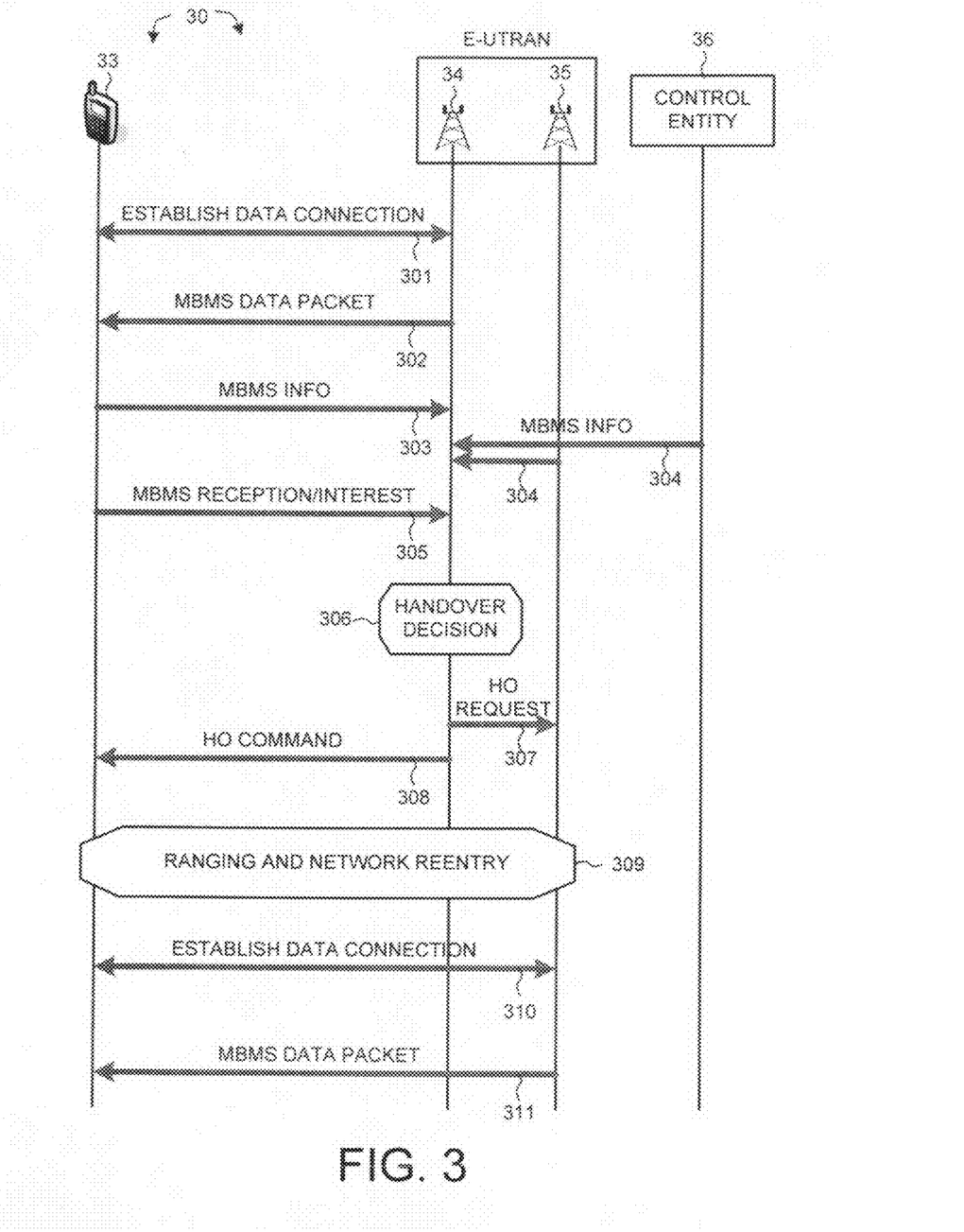
FIG. 3 illustrates a network-assisted solution for MBMS service continuity in an LTE system.

FIG. 3 illustrates a network-assisted solution for MBMS service continuity in an LTE system 30. LTE system 30 comprises a UE33, a source eNB34, a neighbor or target eNB35, and a network control entity 36. UE33 is in RCC_CONNECTED state and establishes a data connection with source eNB34 (step 301). In addition to the established data connection, UE33 also subscribes to an MBMS service and receives MBMS data packets through eNB34 (step 302). Later on, UE33 moves around and handover is considered necessary by eNB34. To facilitate the handover operation, eNB34 acquires MBMS information of neighbor cells (e.g., cells served by eNB35) (step 303 and step 304) and MBMS reception/interest status of UE33 (step 305). Based on the acquired information, source eNB34 makes handover decision in step 306. If UE33 is not receiving or interested in any MBMS service, then source eNB34 decides target cell without considering MBMS service continuity. Otherwise, if UE33 is receiving or interested in MBMS service(s), then source eNB34 decides a target cell based on the acquired MBMS information. A handover request is then sent to target eNB35 (step 307), as well as a handover command is sent to UE33 (step 308). After receiving the handover command, UE33 performs ranging and network reentry procedure with target eNB35 (step 309). Upon completion of the ranging and network reentry procedure, a new data connection is established between UE33 and target eNB35 (step 310). After handover, UE33 continues to receive MBMS data packets through target eNB35 (step 311).

In LTE systems MAC layer, a multicast control channel (MCCH) is used for the transmission of MBMS control information in each MBSFN area, and a multicast traffic channel (MTCH) is used for the transmission of user traffic to UEs receiving MBMS data packets. MCCH and MTCH are carried by a Physical Multicast Channel (PMCH) in PHY layer. In general, MBMS information includes MBSFN subframe configuration in System Information Block 2 (SIB2), MBSFN area ID and MCCH configuration in SIB13, and PMCH configuration and MBMS service list in MCCH. There are various ways for a source eNB to acquire the MBMS information of neighbor cells.

In a first method, eNB34 acquires MBSFN area and service availability in neighbor cells through UE report (step 303). In one example, UE33 reports the MBSFN area or service availability of the interested service of neighbor cells by a new information element (IE) in existing measurement report. In another example, UE33 reports the MBSFN area or service availability of the interested service of neighbor cells by a new RRC message that has an independent trigger. The UE report can be configured by the eNB or rely on UE autonomous trigger, e.g., the UE autonomously turns on the UE report when it receives or is interested in MBMS service.

In a second method, eNB34 acquires the MBMS information of neighbor cells through another network control entity 36 (e.g., MCE36) or through target eNB35 (step 304). For M2 interface enhancement, eNB34 inquires MCE36 whether a target cell is under the same MBSFN area, and MCE36 replies whether the target cell is under the same MBSFN area. If the target cell is not under the same MCE, then MCE36 further communicates with other network control entity (e.g., a neighbor MCE, or an MME) to obtain the MBMS information of the target cell. For X2 interface (e.g., between base stations) enhancement, source eNB34 inquires target eNB35 on the MBMS information (e.g., MBSFN area ID, or MBMS service list, or whether specific MBMS service(s) is provided in a target cell), and target eNB35 replies the MBMS information of the target cell to source eNB34. For M3 interface enhancement, eNB34 inquires an MME on the MBMS information (e.g., MBSFN area ID, or MBMS service list, or whether specific MBMS service(s) is provided in a target cell), and the MME replies the MBMS information of the target cell to eNB34.

With regard to step 305, there are also various ways for UE33 to report its MBMS reception/interest status to its source eNB34. The MBMS reception/interest status is either an MBSFN area or a specific MBMS service ID (e.g., a temporary mobile group identity (TMGI). In one example, UE33 reports the MBMS reception and/or interest status by a new IE in existing measurement report. In another example, UE33 reports the MBMS reception and/or interest status by a new RRC message that has an independent trigger. The MBMS reception/interest status report can be configured by the eNB or rely on UE autonomous trigger, e.g., the UE autonomously turns on the report when it receives or is interested in MBMS service.

Figure 4:
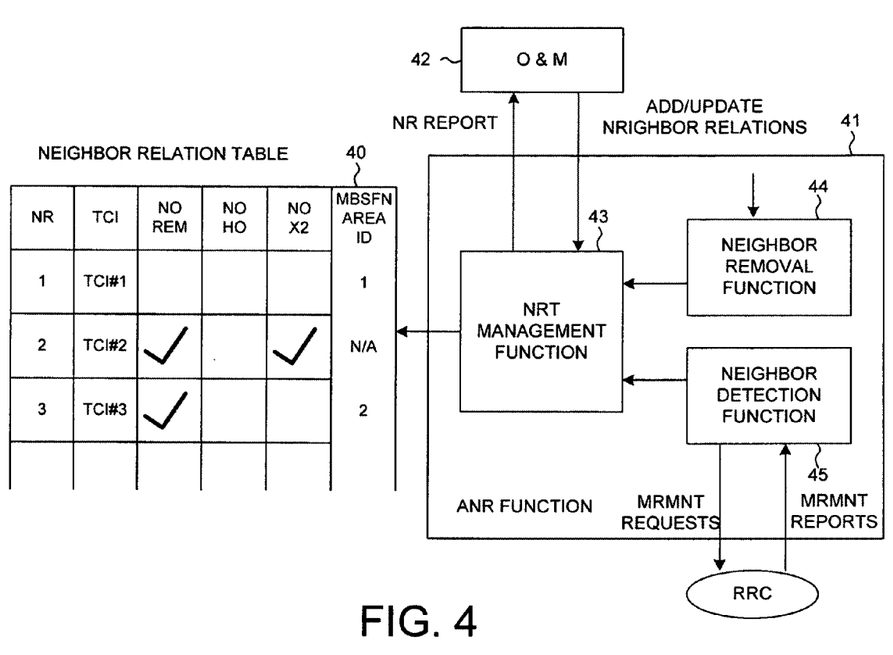
FIG. 4 illustrates an example of an enhanced neighboring relation table (NRT) 40 for indicating MBMS information of neighbor cells.

FIG. 4 illustrates an example of an enhanced neighboring relation table (NRT) 40 for indicating MBMS information of neighbor cells. As illustrated in FIG. 4, NRT 40 comprises a new entry to indicate the MBMS information of neighbor cells, e.g., whether a neighbor cell is in the same MBSFN area, or what the MBSFN area ID of the neighbor cell is. This new entry can be filled by Automatic Neighboring Relation (ANR) function module 41, and be maintained by Operation and Maintenance (O&M) module 42. ANR function module 41 comprises an NRT management function 43, a neighbor removal function 44, and a neighbor detection function 45.

Figure 5:
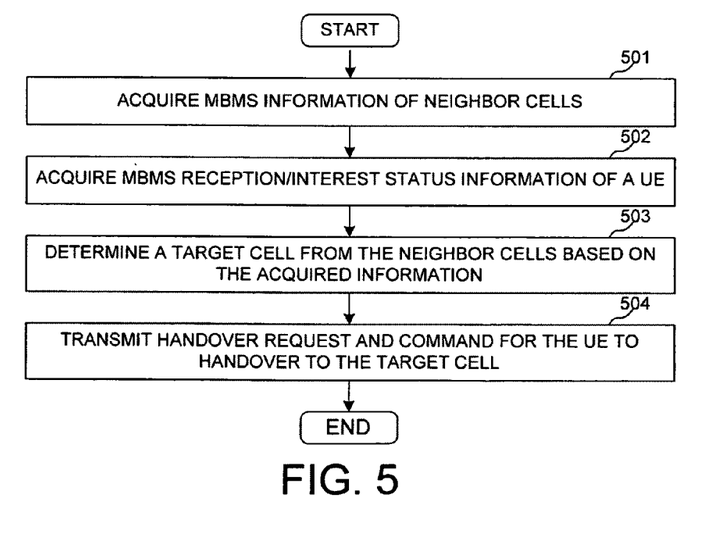
FIG. 5 is a flow chart of a method of MBMS service continuity after handover operation in accordance with one novel aspect.

FIG. 5 is a flow chart of a method of MBMS service continuity after handover operation in accordance with one novel aspect. In step 501, a source eNB acquires MBMS information of neighbor cells. MBMS information comprises MBSFN area ID, MEMS service list, or specific MBMS service IDs supported by the neighbor cells. In step 502, the source eNB acquires MBMS reception and/or interest status information of a UE. The MBMS reception information comprises MBSFN area ID or MBMS service IDs that the UE is currently receiving. The MBMS interest information comprises MBSFN area ID or MBMS service IDs that the UE is interested to receive in the future. In step 503, the source eNB determines a target cell from the neighbor cells. If the UE is not receiving or interested in any MBMS service, then the source eNB decides the target cell without considering MBMS. On the other hand, if the UE is receiving or interested in MBMS service(s), then the source eNB considers the acquired information when deciding the target cell. For example, the eNB decides to handover the UE to a neighbor cell in the same MBSFN area, or handover the UE to a neighbor cell that provides the interested MBMS service(s) in another MBSFN area. Finally, in step 504, the eNB transmits a handover request to the selected target cell, and a handover command to the UE to start the handover operation.

Further handover enhancements can be achieved in carrier aggregation (CA) scenarios. In one example, the source eNB includes the MBMS information (e.g., MBSFN area or received services) in the handover command if the primary serving cell (PCELL) is not in the same MBSFN area. In another example, the target eNB selects a secondary serving cell (SCELL) or changes the PCELL based on the MBMS information to uphold service continuity.

As described above, in RCC_CONNECTED state, mobility and handovers are network-controlled and assisted by the UE. In RRC_IDLE state, however, mobility and cell reselections are controlled by the UE. In one novel aspect, the cell reselection procedure for UE with on-going MBMS service is modified to minimize service interruption. In general, the UE may use various prioritization schemes to perform cell reselection. For example, remaining in the current cell is prioritized, reselection to cells in the same MBSFN area is prioritized, or reselection to cells in another MBSFN area that provides the subscribed MBMS service is prioritized. More specifically, an offset on measured signal strength may be used to prioritize the desired neighbor cell within the same MBSFN area. Such offset may be broadcasted by the eNB or predefined. In addition, the UE can autonomously find out the MBMS information (e.g., MBSFN area ID, or whether interested MBMS service(s) is provided) of the neighbor cells.

Although mobility and cell reselection are controlled by the UE in RCC_IDLE state, the source eNB can assist the UE for making the cell reselection decision. For example, the source eNB can broadcast MBMS information (e.g., MBSFN area ID) of neighbor cells in system information (SI). The MBMS information can be provided through a new system information block (SIB) or through existing SIBs such as SIB13 or SIB4. After acquiring the MBMS information, the UE can make cell reselection decision. For example, the UE releases MBMS bearer and informs a non-access stratum (NAS) entity if the UE discontinues the subscribed MBMS service, and the UE keeps MBMS bearer during cell reselection if the subscribed MBMS service is available after cell reselection.

Localized MBMS Service

Figure 6A:
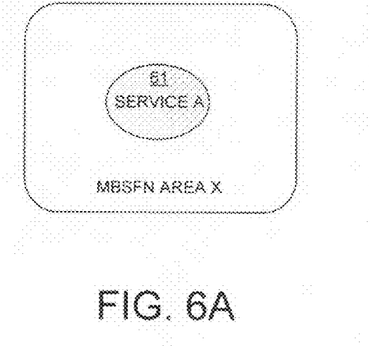
FIGS. 6A and 6B illustrate two possible scenarios for localized MBMS service.

FIGS. 6A and 6B illustrate two possible scenarios for localized MBMS service. In a first scenario illustrated in FIG. 6A, a localized service A is provided within an MBSFN area X. Localized service A is provided only in a specific area 61 that is much smaller than the MBSFN area X. In one example, localized service A is a broadcast service that is related to a baseball match inside a stadium. In another example, localized service A is a broadcast service that is related to an opera show inside a theater. Because the location of service A does not change during the service period, the location information of service A is semi-static.

Figure 6B:
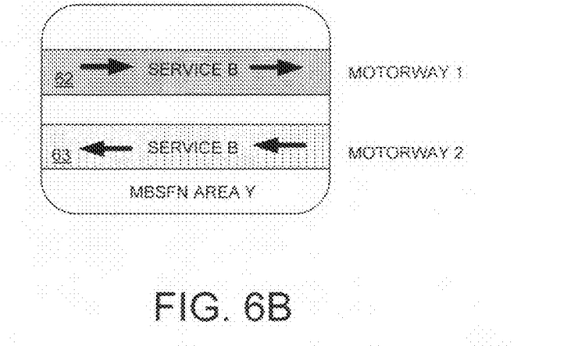

In a second scenario illustrated in FIG. 6B, a localized service B is provided within MBSFN area Y. Localized service B is also provided in a specific area 62 and 63 that is much smaller than the MBSFN area Y. For example, localized service B is a broadcast service for motorway traffic information on Motorway 1 and Motorway 2. Area 62 corresponds to a Motorway 1 and area 63 corresponds to a Motorway 2. Because the location of service B changes dynamically during the service period, the location information of service B is dynamic. For drivers on Motorway 1, they only want to receive traffic information relevant to Motorway 1. Likewise, for drivers on Motorway 2, they only want to receive traffic information relevant to Motorway 2.

In one novel aspect, because a localized service is only relevant within a specific area, the location information of a localized service is provided to a UE such that the UE will only receive the service when the UE moves inside the specific concerned area, and will stop receiving the service when the UE moves outside the concerned area to minimize power consumption.

Figure 7:
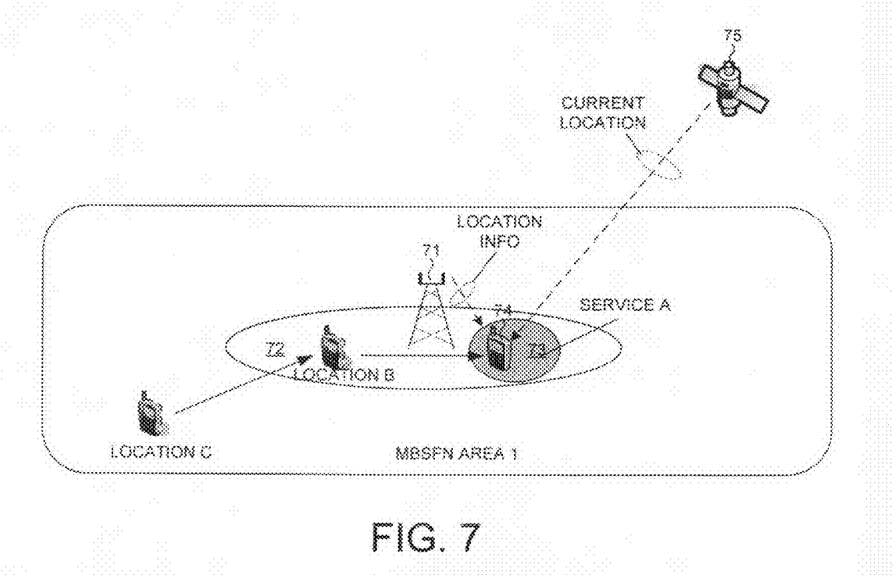
FIG. 7 illustrates examples of providing location information for localized MBMS service in accordance with one novel aspect.

FIG. 7 illustrates examples of providing location information for localized MBMS service in accordance with one novel aspect. In the example of FIG. 7, an eNB71 belongs to MBSFN area 1 and serves cell 72. A localized service A is provided in area 73, which is a specific smaller area inside cell 72. When UE74 is interested in subscribing the localized service A, the location information of service A is provided to UE74 such that UE74 knows whether to receive service A based on the location information. In general, the location information is provided via MCCH. For semi-static location information, the location information is provided per service basis. On the other hand, for dynamic location information, the location information is provided per session basis. For example, a first session provides the location information of Motorway 1, and a second session provides the location information of Motorway 2. The location information may be provided by a network control entity such as an MCE, which acquires from upper layer such as an MME or an MBMS-GW to the eNB.

The location information may be provided in different formats. In a first embodiment, non-geometric description (e.g., cell ID) of the service location is provided. If the location information of the service is provided through information that a UE possesses in normal operation, no extra procedure is needed and more power saving can be achieved. For example, if cell identity is used for providing the location information, once the UE is in the coverage of a cell on the predefined list for a specific service, the UE can start to receive the specific service. However, if cell ID is used, the location information can only be provided in the granularity of a cell. Take FIG. 7 as an example, suppose cell ID is used to provide the location information for service A. UE74 is initially located at Location C. When UE74 moves to location B, UE74 starts to receive service A because location B is within the coverage of cell 72 even though service A is only relevant to area 73, which is much smaller than cell 72.

In a second embodiment, geometric description (e.g., GNSS coordinates) of the service location is provided. Different coordinates such as Polygon (i.e., a set of coordinates), Circle (i.e., coordinates of a center and a radius), or Road (i.e., sidelines formed by coordinates, or a centerline formed by coordinates and a width) may be used as the geometric description. If the location information relevant to a localized service is provided in the form of geometric description, it can accurately define the boundary of the service, for example, a motorway. However, to determine whether to receive the service, the UE also needs to have the capability to obtain its current coordinates (e.g., through GPS75 in FIG. 7). Because the UE may not always have its current coordinates, extra procedure is thus required before the UE can decide whether to receive the service.

Figure 8:
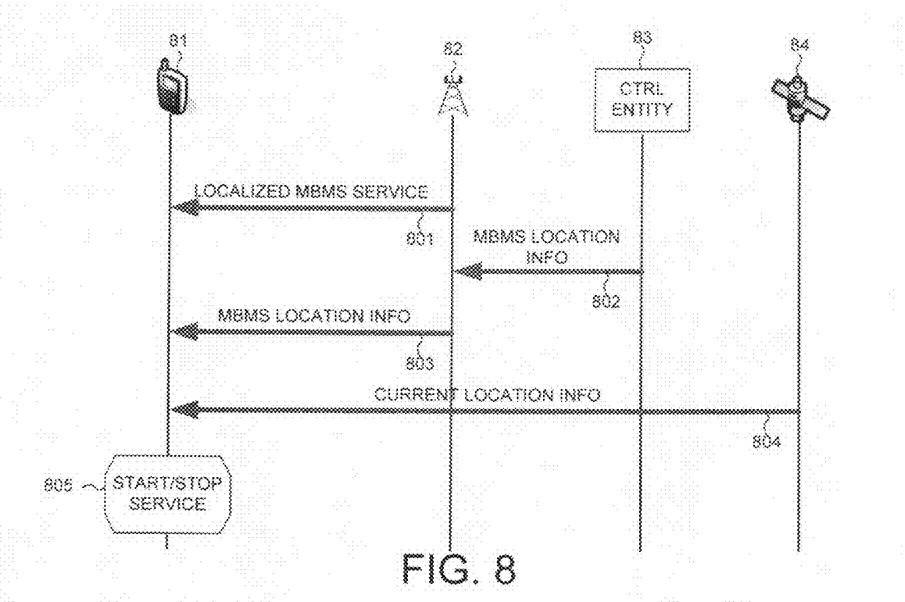
FIG. 8 illustrates a method for providing localized MBMS service in an LTE system in accordance with one novel aspect.

FIG. 8 illustrates a method for providing localized MBMS service in an LTE system 80. LTE system 80 comprises a UE81, a source eNB82, a network control entity 83, and a GPS device 84. In step 801, UE81 receives localized MBMS service through source eNB82. In step 802, eNB82 acquires MBMS service location information from network control entity 83. In step 803, eNB82 forward the location information to UE81. If the location information comprises geometric description, then UE81 obtains its current location (e.g., from GPS84) in step 804. In step 805, based on its current location and the location information of the service, UE81 starts or continues to receive the service if it is in the relevant region/area. Otherwise, UE81 stops to receive the service if it is not in the relevant region/area.

MBMS Counting

MBMS counting in LTE is used to determine if there are sufficient UEs interested in receiving a service to enable the operator to decide if it is appropriate to deliver the service via MBSFN. MBMS counting allows the operator to choose between enabling or disabling MBSFN transmission for the service. Enabling and disabling MBSFN transmission is realized by MBMS Service Suspension and Resumption function. Counting is supported for both a service already provided by MBSFN in an MBSFN area as well as for a service not yet provided via MBSFN area. MBMS counting applies only to UEs in RCC_CONNECTED state, not to UEs in RCC_IDLE state.

The Counting Procedure is initiated by the network. Initiation of the Counting Procedure results in a request to each eNB involved in the providing MBSFN area to send a Counting Request to UEs. The Counting Request is included in the directly extended MCCH message, which contains a list of TMGIs requiring UE feedback. The RCC_CONNECTED state UEs, which are receiving or are interested in the indicated services will respond with a RRC Counting Response message. The RRC Counting Response message includes MBMS service IDs and may optionally include the information to identify the MBSFN area if overlapping is configured.

Figure 9:
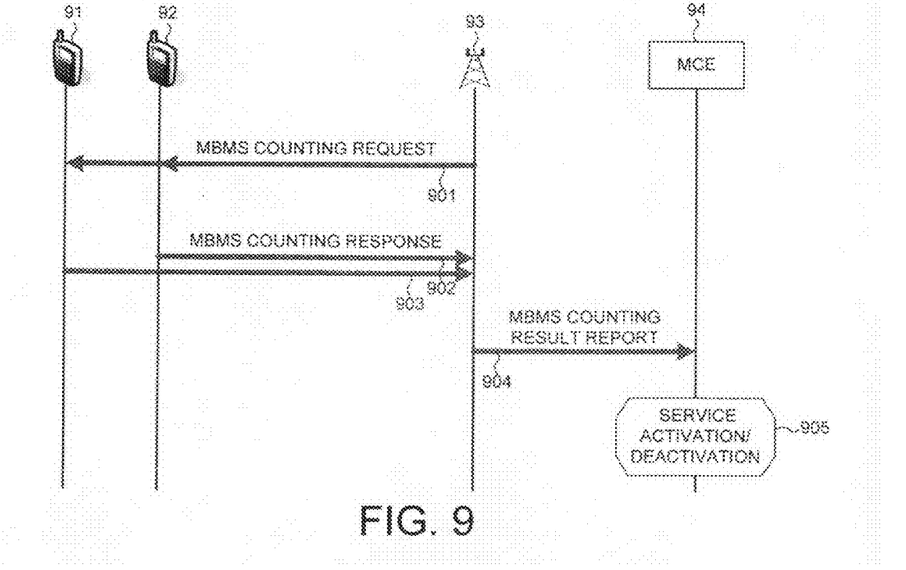
FIG. 9 illustrates a method for performing MBMS counting in an LTE system in accordance with one novel aspect.

FIG. 9 illustrates a method of performing MEMS counting in an LTE system 90. LTE system 90 comprises UE91, UE92, eNB93, and MCE94. In step 901, eNB93 initiates the counting procedure by sending an MBMS Counting Request. The request/polling may be broadcasted to all UEs per MBMS service basis. For example, an indication along with the service information is included in MCCH to trigger UE reporting. Alternatively, a list for services required UE reporting is included in a new IE in MCCH, and the request is broadcasted as an RRC message and the UE report is also prepared and transmitted as an RRC message. The request may also be broadcasted to all UEs as a general polling. For example, an indication along with the MBSFN information (e.g., next to MBSFN area ID) is included in MCCH to trigger UE reporting. In addition to broadcasted polling, the Counting Request may be dedicated polling on a per UE basis. In one example, the eNB polls the UE by a MAC control element (CE) and UE status report is also transmitted in a MAC CE. In another example, the eNB polls the UE by RRC message and UE status report is also transmitted in RRC message.

Upon receiving the MBMS Counting Request message, UE91 and UE92 in RCC_CONNECTED state submit an MBMS Counting Response message in step 902 and step 903. The Counting Response message indicates that the UE is receiving an MBMS service, or is interested to receive an MBMS service. If the UE is in DRX mode, the reporting would still be triggered, but the actual reporting would be delayed to the next duration. If the UE is in RCC_IDLE state, the trigger is cancelled. Alternatively, the UE still reports periodically when it is still receiving any MBMS service.

The pattern of UE reporting may be signaled by the eNB or predefined. In one example, the pattern is defined by a timer. In another example, the signal is done by a dedicated RRC message or broadcasted along with MBMS SIB. In yet another example, a probability parameter is signaled to control the reporting. The timing of UE reporting may have the following choices: periodic reporting when a UE is receiving a service; only report when a UE starts to receive a service; report when a UE starts and stops to receive a service; report after reestablishment; or report after connection request.

In addition to perform counting for services that are currently provided in an MBSFN area, services that the network is considering to provide may also be counted. For example, the eNB broadcasts the to-be-provided services and triggers UE reporting. If enough UE reports interests in a service, then the eNB activates the service. The information of the to-be-provided services is also carried via MCCH, i.e., a list of TMGIs.

In step 904, eNB93 reports MBMS Counting Result to MCE94 based on the Counting Response received from all the UEs. The number of UEs that receives a service or is interested in a service is counted. In step 905, MCE94 determines whether to disable or enable MBSFN transmission based on the counting result. For example, MCE94 deactivates a service upon low subscription and continues the service in unicast.

For MBMS with carrier aggregation (CA), if a UE is receiving MBMS service on an SCELL, either the UE monitors the SI change of the SCELL or the eNB is responsible to provide updates of the MBMS information (e.g., in SIB13). If a CA-capable UE is receiving MBMS other than the serving cells, when receiving counting/polling request, the CA-capable UE can ignore the request, report in any one of the serving cells, or report in one of the serving cell that provides the MBMS service, e.g., belongs to the same MBSFN service area.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   acquiring multimedia broadcast multicast service (MBMS) information of neighbor cells by a source base station in a wireless communication network, wherein the source base station acquires the MBMS information of neighbor cells through UE report via a new information element (IE) with an existing RRC message or through UE report via a new radio resource control (RRC) message that has an independent trigger;
   acquiring MBMS reception/interest status information of a user equipment (UE), wherein the MBMS reception/interest status information comprises MBMS service IDs of MBMS services that the UE is currently receiving or is interested in reception;
   selecting a target cell for handover from the neighbor cells by prioritizing the neighbor cells based on the acquired MBMS information of neighbor cells and MBMS reception/interest of the UE, such that the MBMS information of the target cell indicates that selected the target cell supports the MBMS reception/interest of the UE; and transmitting a handover request and a handover command for the UE to handover to the target cell such that MBMS service continuity for the UE is maintained.

2. The method of claim 1, wherein the MBMS information comprises an MBMS single frequency network (MBSFN) area ID and an MBMS service list of MBMS service IDs supported by each neighbor cell.

3. The method of claim 1, wherein the UE report comprises MBMS service availability of neighbor cells, and wherein the UE report is configured by the source base station or relied on UE autonomous trigger.

4. The method of claim 1, wherein the source base station acquires the MBMS information of the target cell through a multi-cell/multicast coordination entity (MCE), or through a mobility management entity (MME), or through the target cell itself.

5. The method of claim 1, wherein the source base station acquires the MBMS reception/interest information through UE report via a new information element (IE) or via a new radio resource control (RRC) message.

6. The method of claim 5, wherein the UE report is configured by the source base station or relied on UE autonomous trigger.

7. The method of claim 1, wherein the source base station maintain a new entry in a neighboring relation table (NRT) that indicates the MBMS information of the neighbor cells.

8. A base station, comprising:
a multimedia broadcast multicast service (MBMS) control module that acquires MBMS information of neighbor cells in a wireless communication network, wherein the MBMS control module also acquires MBMS reception/interest status information of a user equipment (UE), wherein the base station acquires the MBMS information of neighbor cells through UE report via a new information element (IE) with an existing RRC message or through UE report via a new radio resource control (RRC) message that has an independent trigger, and wherein the MBMS reception/interest status information comprises MBMS service IDs of MBMS services that the UE is currently receiving or is interested in reception, and wherein the MBMS control module determines a target cell for handover from the neighbor cells based on the acquired MBMS information of neighbor cells and MBMS reception/interest information of the UE, such that the MBMS information of the target cell indicates that the target cell supports the MBMS reception/interest of the UE; and a transceiver that transmits a handover request and a handover command for the UE to handover to the target cell such that MBMS service continuity for the UE is maintained.

9. The base station of claim 8, wherein the MBMS information comprises an MBMS single frequency network (MBSFN) area ID and an MBMS service list of MBMS service IDs supported by each neighbor cell.

10. The base station of claim 8, further comprising:
a neighboring relation table (NRT) having a new entry that indicates the MBMS information of the neighbor cells, wherein the new entry is filled by an automatic neighboring relation (ANR) function.

11. The base station of claim 8, wherein the base station provides location information of a localized MBMS service, wherein the localized MBMS service is available inside a specific location within an MBMS single frequency network (MBSFN) area.

12. The base station of claim 8, wherein the base station transmits an MBMS counting request, and wherein the base station reports MBMS counting result providing the number of UEs that are receiving an MBMS service or are interested in receiving the MBMS service.

* * * * *